(12) United States Patent
Kim et al.

(10) Patent No.: US 7,233,122 B2
(45) Date of Patent: Jun. 19, 2007

(54) SELF-RUNNING ROBOT HAVING PRESSING SENSING FUNCTION AND CONTROL METHOD THEREOF

(75) Inventors: Jong-sung Kim, Seoul (KR); Ji-hoon Sung, Busan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/318,500

(22) Filed: Dec. 28, 2005

(65) Prior Publication Data
US 2006/0238157 A1 Oct. 26, 2006

(30) Foreign Application Priority Data
Apr. 25, 2005 (KR) ............ 10-2005-0034144

(51) Int. Cl.
*B25J 9/00* (2006.01)
(52) U.S. Cl. ............................ 318/568.12; 901/1
(58) Field of Classification Search ......... 318/568.11, 318/568.12, 567, 568.1; 901/1
See application file for complete search history.

(56) References Cited

U.S. PATENT DOCUMENTS 6,180,898 B1 * 1/2001 Terada et al. .......... 200/51 LM
6,452,348 B1 * 9/2002 Toyoda ..................... 318/3
6,809,490 B2 * 10/2004 Jones et al. ............ 318/568.12

* cited by examiner

*Primary Examiner*—Bentsu Ro
(74) *Attorney, Agent, or Firm*—Birch, Stewart, Kolasch & Birch, LLP

(57) ABSTRACT

Disclosed is a pressing sensing technology of a self-running robot, comprising a pressing sensing unit for sensing pressing on the top of the self-running robot and a microprocessor for controlling driving of the self-running robot in accordance with the sensing signal from the pressing sensing unit to enable the self-running robot to escape from an area where the pressing has occurred. Accordingly, the invention has an advantage in that it can prevent a function degradation and damage of the self-running robot by changing a running direction of the self-running robot when pressing on the self-running robot is sensed to enable the self-running robot to escape from the area where the pressing has occurred, or notifying, when the pressing cannot be released, a user of the state in voice to take any necessary action.

13 Claims, 4 Drawing Sheets

SELF-RUNNING ROBOT HAVING PRESSING SENSING FUNCTION AND CONTROL METHOD THEREOF

BACKGROUND OF THE INVENTION

This U.S. non-provisional patent application claims priority under 35 U.S.C. § 119 of Korean Patent Application 2005-34144 filed on Apr. 25, 2005, the entire contents of which are hereby incorporated by reference.

1. Field of the Invention

The present invention relates to a self-running robot, and more particularly, to a pressing sensing technology of a self-running robot to sense pressing on the top of the self-running robot, and control driving of the self-running robot based on the sensed result so as to avoid obstacles or notify a user of the sensed result.

2. Description of Related Art

Robots were developed for industrial purposes and used as a part of a factory automation system. Further, the robots have been utilized to collect or gather information on behalf of humans in extreme environments humans cannot endure. Such a robot engineering field, while being recently used in a newest space development industry, has been continuously developed, and human-friendly home robots have been developed in recent years. A typical example of such human-friendly home robots is a cleaning robot.

The cleaning robot that is of a self-running type is an appliance which sucks dirt or debris, while self-running in a predetermined cleaning area such as a house or an office. Such a cleaning robot includes a moving unit including left and right wheel motors for moving the cleaning robot, a plurality of sensors for sensing obstacles so as to prevent the cleaning robot from striking obstacles in the cleaning area, and a microprocessor for controlling the overall device of the cleaning robot, together with constructions of a general vacuum cleaner to suck the dirt or debris.

Such a cleaning robot is configured to continuously clean a cleaning area while avoiding obstacles by changing its movement direction when obstacles are sensed through obstacle sensors installed in the robot during movement of the robot in the cleaning area.

However, although conventional cleaning robots can sense obstacles present in its running path within a certain sensible vertical range via obstacle sensors, it cannot sense an obstacle present at a level outside the sensible vertical range, in particular, a level higher than the sensible vertical range. For example, where there is an obstacle present at a level higher than the sensible vertical range of the cleaning robot, but lower than the level of the highest portion of the cleaning robot, the cleaning robot cannot sense this obstacle. In this case, if the cleaning robot runs continuously without sensing such an obstacle, the cleaning robot may become jammed between the floor and the obstacle, so that the top of the cleaning robot is pressed downwards by the obstacle. When the cleaning robot runs continuously without being stopped in this state, the pressing force applied to the top of the cleaning robot is increased, thereby causing the body of the cleaning robot to be damaged. Furthermore, the moving unit of the cleaning robot, in particular, the motor driving left and right wheels, may be severely damaged. In addition, the cleaning performance of the cleaning robot is degraded.

SUMMARY OF THE INVENTION

It is, therefore, an object of the present invention to provide a self-running robot having a pressing sensing function and a control method thereof, which are capable of preventing a function degradation and damage of the self-running robot by sensing pressing on the top of the self-running robot, and controlling driving of the self-running robot based on the sensed result to allow the robot to escape from an area where the pressing has arisen.

Another object of the invention is to provide a self-running robot having a pressing sensing function and a control method thereof, which are capable of preventing a function degradation and damage of the self-running robot when pressing on the robot is continued, by notifying a user of this state in voice to take any necessary action.

The self-running robot according to an aspect of the present invention generates an avoidance command in response to a sensing signal from a pressure or pressing sensing unit arranged on the top thereof to escape from an area where the pressing has occurred. In addition, when the sensing signal is still output from the pressing sensing unit even after the generation of the avoidance command, the self-running robot notifies a user of the above state to take any necessary action. To implement this, in accordance with an aspect of the present invention, there is provided a self-running robot having a pressing sensing function, comprising: a pressing sensing unit for sensing pressing on a top of the self-running robot; a microprocessor for controlling a driving of the self-running robot in accordance with the sensing signal from the pressing sensing unit to enable the self-running robot to escape from an area where the pressing has occurred; a memory for storing an audio signal used to notify the pressing; and an audio output unit for converting the audio signal stored in the memory into an audible sound under the control of the microprocessor and outputting the audible sound.

The self-running robot according to another aspect of the present invention senses a rotational speed of left and right wheel motors to move the self-running robot, calculates a running speed of the self-running robot, compares the calculated speed with a reference speed to determine whether pressing has arisen on the self-running robot, and outputs an avoidance command to enable the self-running robot to escape from an area where the pressing has occurred when the pressing is sensed. Further, when the pressing is sensed even after outputting the avoidance command, the robot notifies a user of the above state in voice to take any necessary action.

To implement this, in accordance with another aspect of the present invention, there is provided a rotation detection unit for outputting a signal corresponding to a rotational speed of left and right wheel motors to move the self-running robot; a microprocessor for controlling the left and right wheel motors to enable the self-running robot to escape from a corresponding area when a running speed of the self-running robot computed by using the output signal from the rotation detection unit is slower than a reference speed; a memory for storing an audio signal used to notify the pressing; and an audio output unit for converting the audio signal stored in the memory into an audible sound under the control of the microprocessor and outputting the audible sound.

The present invention as mentioned above has an advantage that it can prevent a function degradation and damage of the self-running robot by changing a running direction of the self-running robot when pressing on the top of the robot is sensed to allow the robot to escape from an area where the pressing has arisen, or notifying a user of the sensed result in voice when the robot cannot escape from the area, to take any necessary action.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments according to the present invention will now be described in detail with reference to the accompanying drawings.

Further, a description will be given under the assumption that the self-running robot of the present invention is a cleaning robot that is a typical example of the self-running robot.

Figure 1:
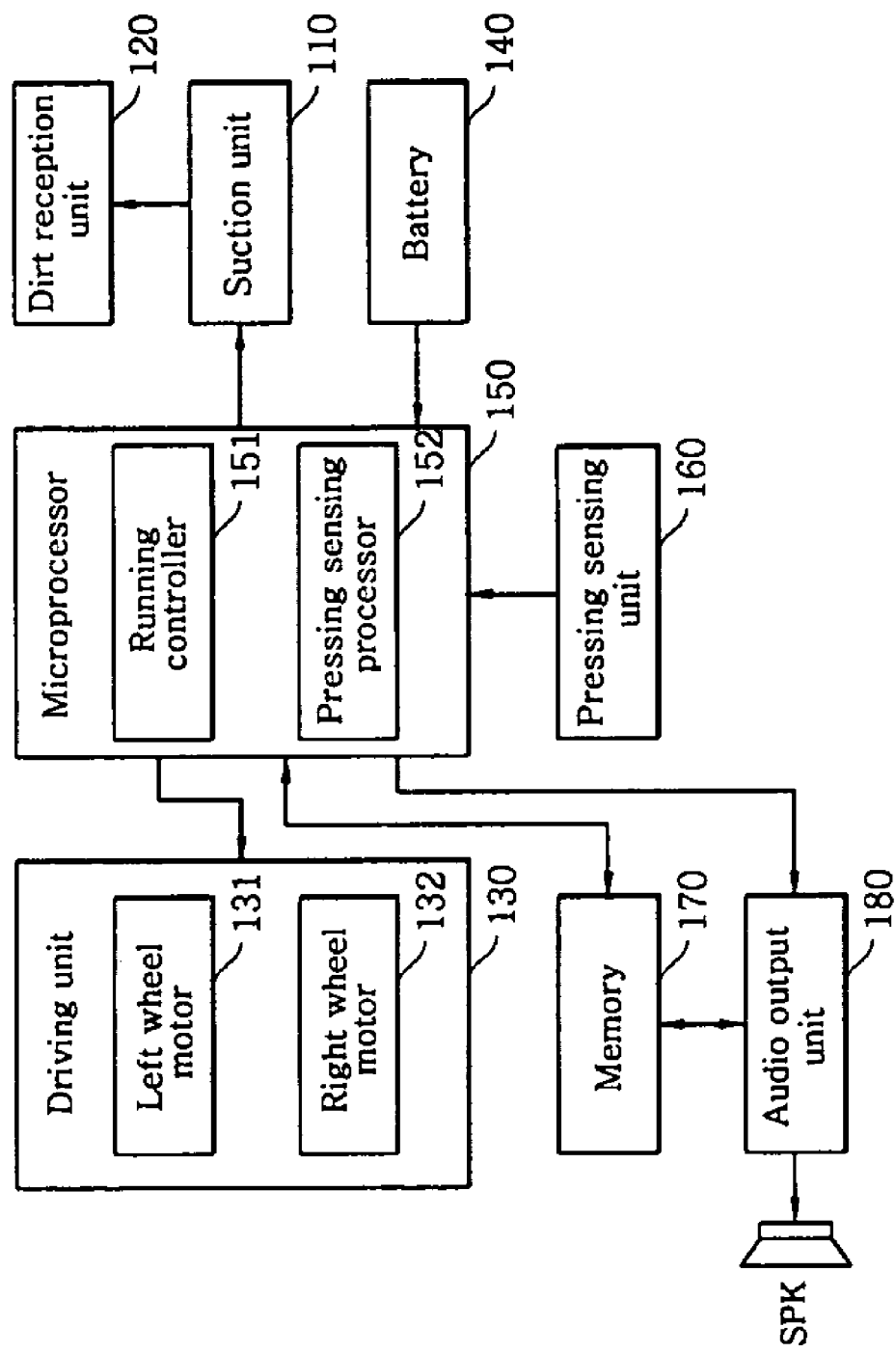
FIG. 1 is a block diagram schematically illustrating a self-running robot having a pressing sensing function in accordance with a preferred embodiment of the present invention.

FIG. 1 is a block diagram illustrating a cleaning robot of a self-running robot having a pressing sensing function in accordance with a preferred embodiment of the present invention. Referring to FIG. 1, the cleaning robot having a pressing sensing function in accordance with the present invention includes a pressing sensing unit 160 for sensing pressing on the cleaning robot, and outputting a sensing signal based on the sensed result, a memory 170 for storing an audio signal used to notify the pressing on the cleaning robot, an audio output unit 180 for converting the audio signal stored in the memory 170 into an audible sound and outputting the same, and a microprocessor 150 including a running controller 151 for controlling driving of a driving unit 130, the microprocessor 150 controlling the overall device of the cleaning robot, in addition to a basic construction of the cleaning robot.

The basic configuration of the cleaning robot includes a suction unit 110, having a dirt sensor for sensing dirt or debris in a cleaning area, for sucking the dirt or debris sensed by the dirt sensor, a dirt reception unit 120 for receiving the dirt or debris collected by the suction unit 110, a driving unit 130 including left and right wheel motors 131 and 132 for moving the cleaning robot, a battery 140 for supplying a driving power for the suction unit 110 and the driving unit 130, and a microprocessor 150 for controlling the overall device of the cleaning robot. Since such a basic configuration of the cleaning robot is well known in the art, the detailed description thereof will be omitted.

The driving unit 130 controls the level of electric power supplied to the left and right wheel motors 131 and 132 according to a control signal from the microprocessor 150 to move the cleaning robot. The left and right wheel motors 131 and 132 of the driving unit 130 are connected to the left and right wheels that are used to move the cleaning robot. Thus, the cleaning robot can run in front/back and left/right directions according to rotational speeds and directions of the left and right wheel motors 131 and 132. For example, if a control signal from the running controller 151 represents a right-handed rotation command for the cleaning robot, the driving unit 130 increases the level of the electric power applied to the left wheel motor 131, rather than decreasing the level of the electric power to the right wheel motor 132, to turn the cleaning robot right.

The pressing sensing unit 160 is arranged at, for example, the center of the top of the cleaning robot and may be a switch which is turned on or off in accordance with connection or disconnection of contacts thereof depending on a pressure applied thereto; but is not limited to the above example and may be also implemented by various pressure sensors to sense a pressure. Generally, the switch of the pressing sensing unit 160 is maintained in an OFF state while the cleaning robot moves. However, in case where a pressure is applied to the top of the cleaning robot, i.e., pressing on the top of the cleaning robot occurs, the switch is changed to an ON state, and then a sensing signal is provided from the pressing sensing unit 160 to the microprocessor 150. The sensing signal to the microprocessor 150 may be a current flowing via the switch. The microprocessor 150 determines that the pressure was applied to the top of the cleaning robot based on the sensing signal from the pressing sensing unit 160.

The memory 170 may be a nonvolatile memory in that data can be read and written, such as EEPROM or flash memory. An operation program and its related data to drive the cleaning robot are stored in the memory 170. The data stored in the memory 170 is accessed and controlled by the microprocessor 150. According to an aspect of the present invention, the memory 170 stores an audio signal used to notify a user of information representing that pressing on the top of the cleaning robot has been sensed. This audio signal is converted into an audible sound by the audio output unit 180, and is then output.

The audio output unit 180 may be constituted by, for example, a voice source reproduction chip such as a YAMAHA chip to reproduce an audio signal stored in an audio source form in the memory 170 or a DSP chip to reproduce an audio signal stored in the memory 170 in an MP3 form. The audio signal stored in the memory 170 is accessed and reproduced by the control of the microprocessor 150 to output via an audio output means such as a speaker.

The microprocessor 150 that controls the overall device of the cleaning robot includes a running controller 151 for controlling an operation of the driving unit 130 having the left and right wheel motors 131 and 132, and a pressing sensing processor 152 for outputting, when a sensing signal is received from a pressing sensing unit 160, a control signal to the running controller 151 to enable the cleaning robot to escape from a corresponding area according to on an avoidance algorithm and providing, when the sensing signal is continuously received from the pressing sensing unit 160 even after enabling the cleaning robot to escape from the corresponding area in response to the sensing signal, the audio output unit 180 with a control signal to notify a user of the above state in voice.

The running controller 151 controls the driving unit 130 to move the cleaning robot by outputting a control command depending on the operation program of the cleaning robot. When the pressing sensing processor 152 receives the sensing signal from the pressing sensing unit 160, it transmits a control command to the running controller 151 to enable the cleaning robot to escape from an area where the cleaning robot is pressed according to the avoidance algorithm. The avoidance algorithm may be a control command that causes the cleaning robot to move backward, and rotate in a reverse direction to its previous direction and then move again.

Meanwhile, when the sensing signal is still continuously received from the pressing sensing unit 160 even after enabling the cleaning robot to escape from the area where it is pressed according to the avoidance algorithm, the pressing sensing processor 152 recognizes that the cleaning robot hasn't escaped from that area, and then outputs a control signal to the audio output unit 180 to notify the user of a pressing sensing audio alert message such as "pressing on the cleaning robot is sensed".

The audio output unit 180 accesses the audio signal stored in the memory 170 in response to the control signal from the pressing sensing processor 152 and then converts the accessed audio signal into an audible sound to output it via an audio output means such as a speaker embedded in the cleaning robot.

Accordingly, the prevent invention has an advantage in that it can prevent a function degradation and damage of the cleaning robot by changing the moving direction of the cleaning robot to enable the cleaning robot to escape from the corresponding area according the avoidance algorithm when the pressing or pressure given on the top thereof is sensed, or notifying the user of the above state to take any necessary action when the robot hasn't escaped from the area.

Figure 2:
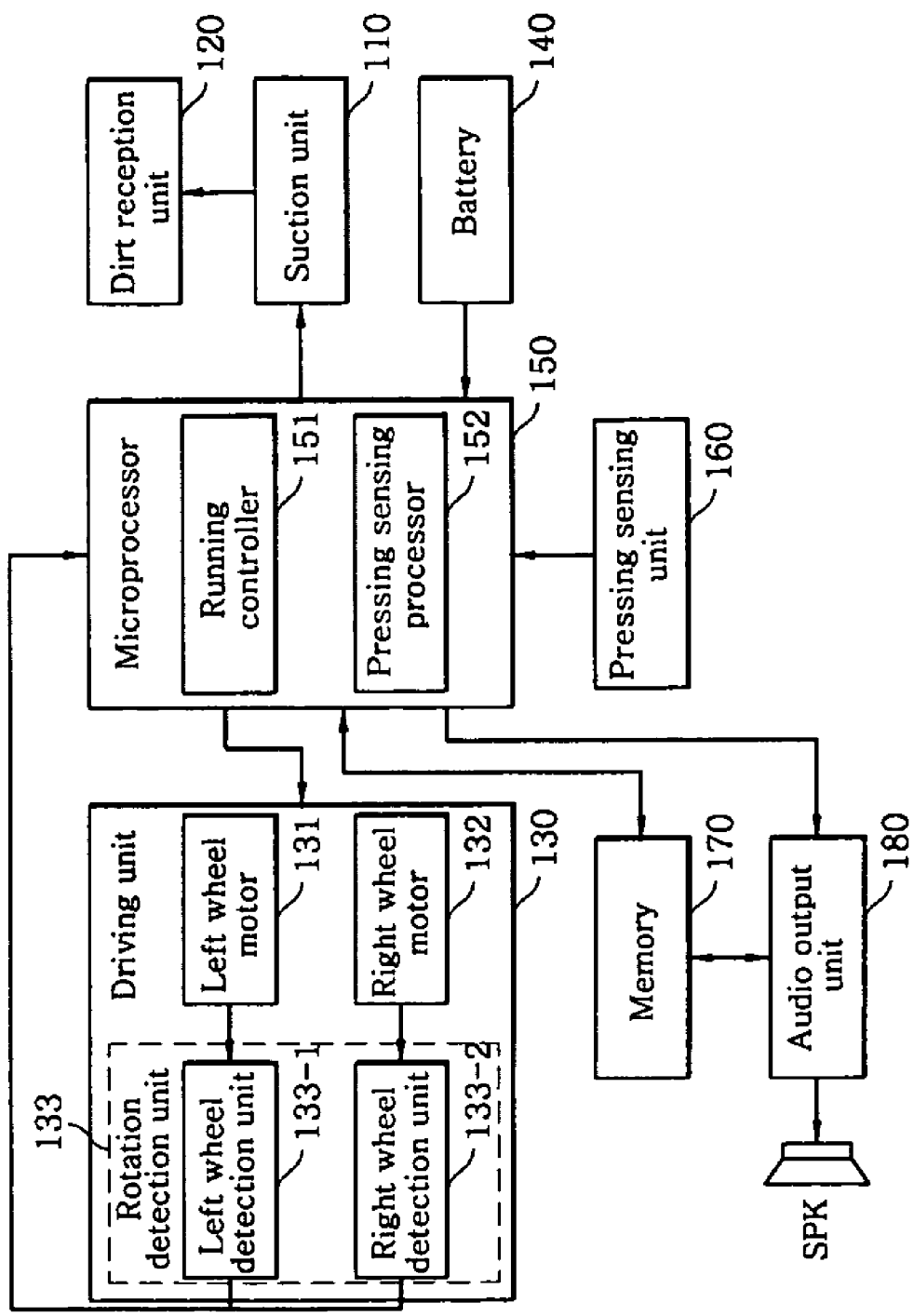
FIG. 2 is a block diagram schematically illustrating a self-running robot having a pressing sensing function in accordance with another embodiment of the present invention.

FIG. 2 is a block diagram schematically illustrating a self-running robot having a pressing sensing function in accordance with another embodiment of the present invention. As shown therein, the driving unit 130 of the cleaning robot according to the present invention further comprises a rotation detection unit 133 for outputting a signal corresponding to a rotational speed of the left and right wheel motors 131 and 132. In this configuration, the pressing sensing processor 152 computes a running speed of the cleaning robot using pulse information provided from the rotation detection unit 133; and outputs a control signal to the running controller 151 to enable the cleaning robot to escape from the corresponding area according to the avoidance algorithm when the computed running speed is slower than a reference speed, and provides the audio output unit 180 with a control signal to notify the user of the state via a voice when the computed running speed is still slower than the reference speed even after controlling the driving of the cleaning robot according to the rotational speed thereof.

The rotation detection unit 133 provides a signal corresponding to the rotational speed of the left and right wheel motors 131 and 132 of the driving unit 130 to move the cleaning robot. That is, the rotation detection unit 133 includes a left wheel detection unit 133-1 for generating a pulse signal representing the RPM of the left wheel motor 131 and a right wheel detection unit 133-2 for generating a pulse signal representing the RPM of the right wheel motor 132.

When a control signal is output from the running controller 151 of the microprocessor 150 to the driving unit 130, the driving unit 130 drives the left or right wheel motor 131 or 132 in response to the control signal to move the cleaning robot. At this time, the left wheel detection unit 133-1 and the right wheel detection unit 133-2 of the rotation detection unit 133 generate pulse signals representing RPMs of the left and right wheel motors 131 and 132, respectively, and then output the pulse signals to the pressing sensing processor 152.

The pressing sensing processor 152 receives the pulse signals representing respective RPMs of the left and right wheel motors 131 and 132 from each of the left wheel detection unit 133-1 and the right wheel detection unit 133-2 of the rotation detection unit 133 and then calculates a running speed of the cleaning robot. It then compares the calculated running speed with a reference speed of the cleaning robot to check whether pressing has occurred on the cleaning robot, and provides the running controller 151 with a control signal to change the running direction of the cleaning robot according to the avoidance algorithm upon the occurrence of the pressing, to enable the cleaning robot to escape from the pressing.

For example, in case where a pressure or pressing force has been applied to the top of the cleaning robot while it is moving normally, the robot would move at a reduced speed compared to the reference speed by the pressing. Accordingly, the rotation detection unit 133 outputs a pulse signal having a pulse period different from that of a pulse signal generated during the normal running.

The pressing sensing processor 152 recognizes that the pressing has occurred on the robot in case where a variation in the pulse period of the pulse signal output from the rotation detection unit 133 continues for a predetermined time, and outputs a control command to enable the cleaning robot to escape from the corresponding area according to the avoidance algorithm.

After controlling the cleaning robot using the avoidance algorithm, the pressing sensing processor 152 computes a running speed based on the pulse signals output from the left wheel detection unit 133-1 and the right wheel detection unit 133-2 of the rotation detection unit 133, and then compares the computed running speed with the reference speed. If the computed running speed is equal to the reference speed, the pressing sensing processor 152 recognizes the release of the pressing state and then enables the cleaning function to be continuously executed.

In the meantime, if the computed running speed is slower than the reference speed in the comparison, the pressing sensing processor 152 recognizes that the pressing state cannot be released and then outputs a control signal to the audio output unit 180 to notify the user of a pressing sensing alert message such as "pressing on the cleaning robot is sensed" in voice.

Although there is disclosed in the above-described embodiment an example having the rotation detection unit 133 and the pressing sensing unit 160 separately installed, the present invention is not limited to the above example but may be implemented that it has only the rotation detection unit 133 wherein pressing on the cleaning robot is also sensed.

Figure 3:
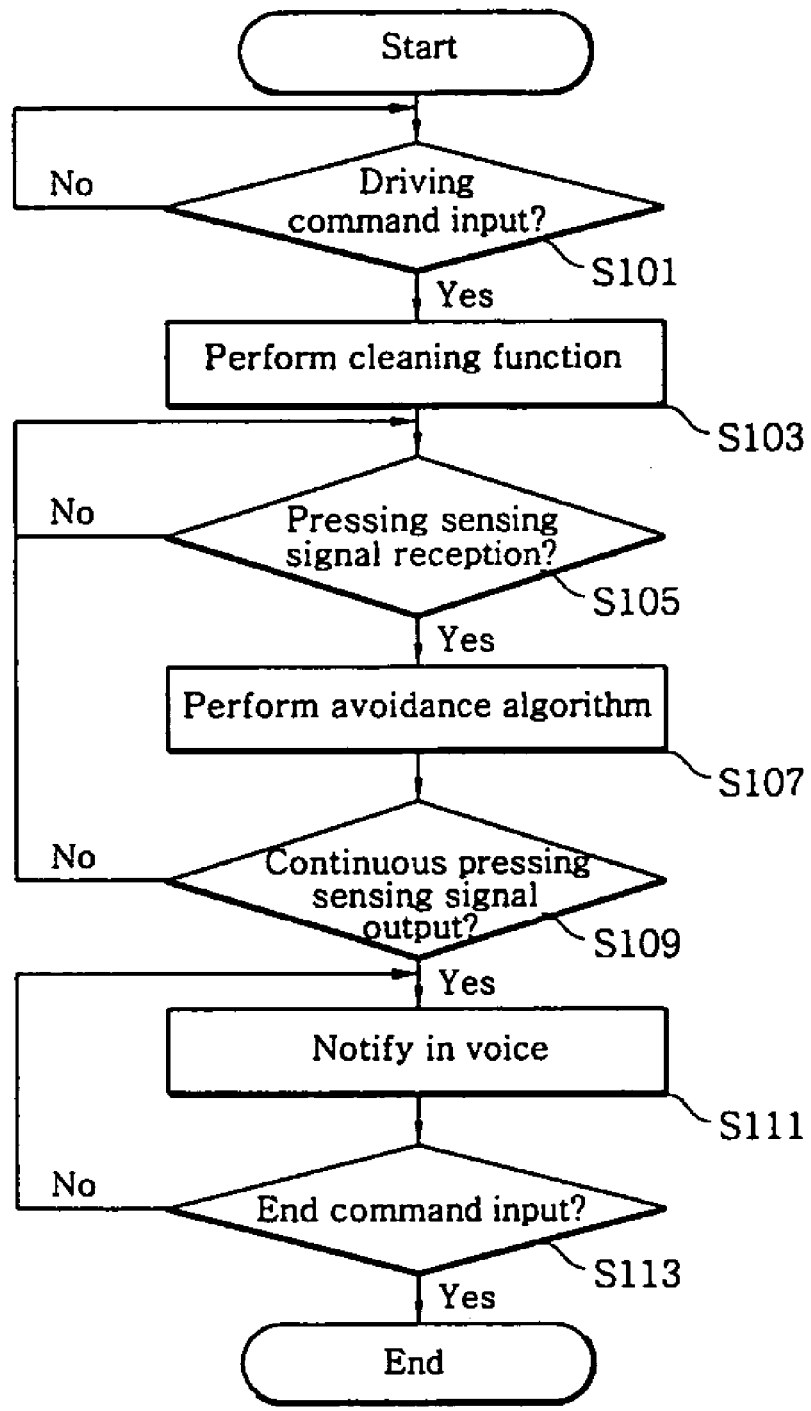
FIG. 3 is a flowchart schematically illustrating a control procedure of a self-running robot in accordance with a preferred embodiment of the present invention.

FIG. 3 is a flowchart schematically illustrating a control procedure of a self-running robot in accordance with a preferred embodiment of the present invention. As shown, when a user inputs a driving command for the cleaning robot at step S101, the cleaning robot performs the cleaning function according to the driving command at step S103.

When a pressure or pressing force has been applied to the top of the cleaning robot during execution of the cleaning function, the pressing sensing unit 160 provides a sensing signal to the pressing sensing processor 152 of the microprocessor 150. The pressing sensing processor 152, when the sensing signal is continuously received from the pressing sensing unit 160 for a predetermined time at step S105, transmits a control command to the running controller 151 according to the avoidance algorithm to enable the cleaning robot to escape from the corresponding area at step 107.

In this process, the avoidance algorithm may be a control command that allows the cleaning robot to move backward, and rotate in a reverse direction to its previous direction and then continue moving again.

The running controller 151 drives the driving unit 130 in response to the control signal transmitted from the pressing sensing processor 152 to control the cleaning robot to escape from the area.

When the sensing signal is still continuously received from the pressing sensing unit 160 even after controlling the cleaning robot according to the avoidance algorithm at step S109, the pressing sensing processor 152 recognizes that the robot hasn't escaped from the area where the pressing has occurred, and then outputs a control signal to the audio output unit 180 to notify the user of a pressing sensing alert message such as "pressing on the robot is sensed" in voice at step S111.

That is to say, the audio output unit 180 accesses the audio signal stored in the memory 170 in response to the control signal from the pressing sensing processor 152 and then converts the accessed audio signal into an audible sound to output the same via an audio output means such as a speaker provided in the cleaning robot.

When the user inputs a driving stop command according to the pressing sensing alert message of the cleaning robot, the cleaning function of the cleaning robot is ended at step S113.

Figure 4:
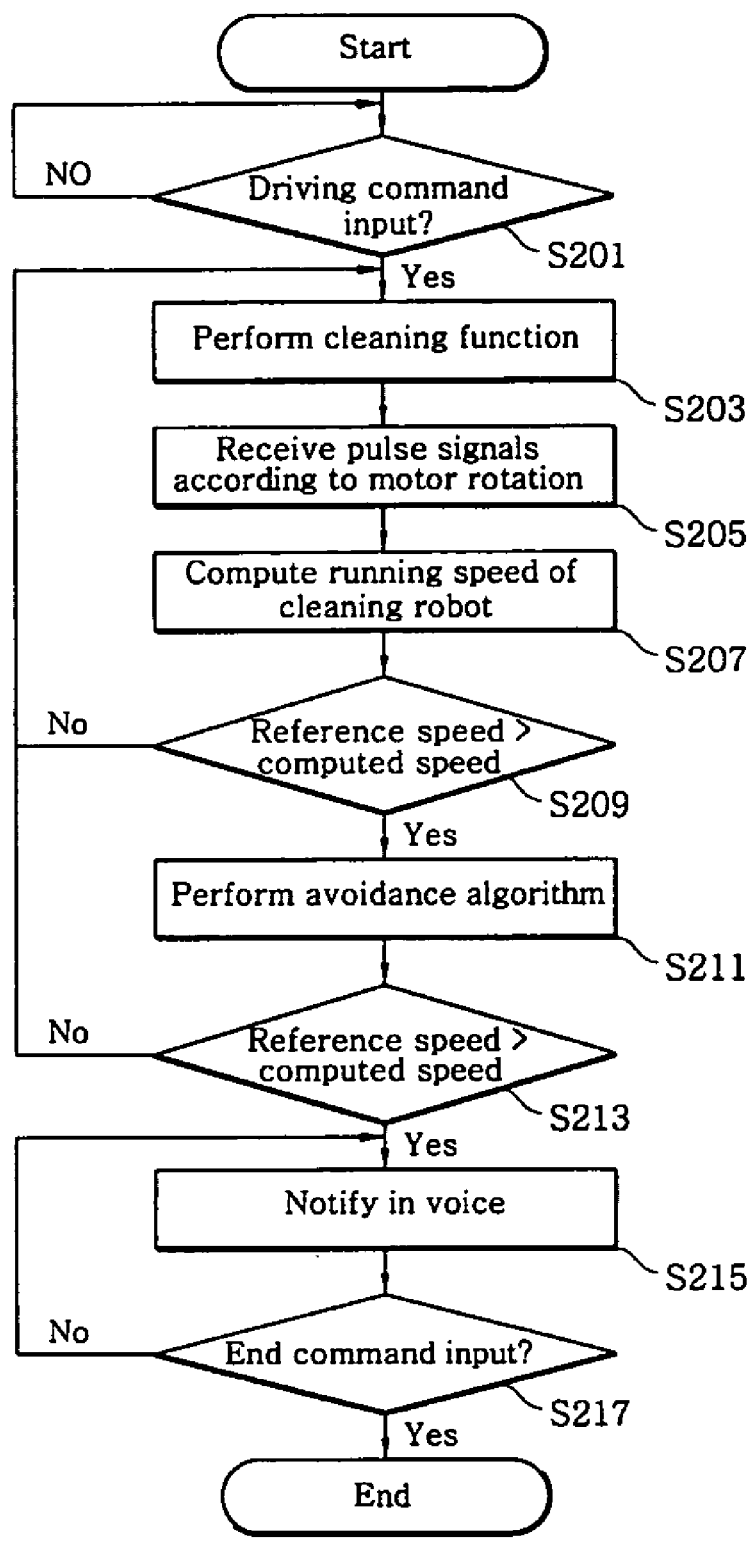
FIG. 4 is a flowchart schematically illustrating a control procedure of a self-running robot in accordance with another embodiment of the present invention.

FIG. 4 is a flowchart schematically illustrating a control procedure of a self-running robot in accordance with another embodiment of the present invention. As shown, in the present embodiment, pressing on the cleaning robot is sensed depending on the rotational speed of the left and right wheel motors 131 and 132 of the driving unit 130 to move the cleaning robot.

Specifically, when a driving command for the cleaning robot is inputted at step S201, the running controller 151 of the microprocessor 150 outputs a control signal to the driving unit 130 to perform the cleaning function at step S203. Then, the driving unit 130 serves to drive the left and right wheel motors 131 and 132 in response to the control signal to move the cleaning robot. During this process, the left and right wheel detection units 133-1 and 133-2 of the rotation detection unit 133 generate pulse signals representing RPMs of the associated motors, and output the pulse signals to the pressing sensing processor 152, respectively, at step S205.

At a next step S207, the pressing sensing processor 152 calculates a running speed of the cleaning robot using the pulse signals, representing respective RPMs of the motors, output from the left and right wheel detection units 133-1 and 133-2 of the rotation detection unit 133. Thereafter, it compares the calculated running speed with a reference speed of the cleaning robot at step S209, and controls it to continue the cleaning function if the calculated running speed is equal to the reference speed.

On the other hand, if the calculated running speed is slower than the reference speed, the pressing sensing processor 152 recognizes that the pressing has occurred on the cleaning robot and then outputs a control signal to the running controller 151 to change the running direction according to the avoidance algorithm and to enable the cleaning robot to escape from the pressing at step S211.

After applying the avoidance algorithm, the pressing sensing processor 152 again calculates a running speed of the cleaning robot using the pulse signals output from each of the left and right wheel detection units 133-1 and 133-2 of the rotation detection unit 133, and then compares the calculated running speed with the reference speed at step S213. If the calculated running speed is equal to the reference speed, the pressing sensing processor 152 recognizes that the pressing state has been released and then enables the cleaning function to be continuously executed.

Meanwhile, if the calculated running speed is slower than the reference speed, the pressing sensing processor 152 recognizes that the pressing on the cleaning robot cannot be released using the avoidance algorithm and then outputs a control signal to the audio output unit 180 to notify the user of a pressing sensing alert message such as "pressing on the robot is sensed" in voice at step S215.

When the user inputs a driving stop command according to the pressing sensing alert message, the cleaning function of the cleaning robot is ended at step S217.

As described above, the self-running robot having a pressing sensing function and control method thereof in accordance with the invention can prevent a function degradation and damage of the self-running robot by sensing a pressure or pressing on the top of the self-running robot, and controlling driving of the self-running robot according to an avoidance algorithm to enable the robot to escape from an area where the pressing has arisen.

Moreover, the invention can prevent a function degradation and damage of the self-running robot by notifying, in case where the self-running robot cannot escape from an area where pressing on the robot has occurred using the avoidance algorithm, a user of the above state in voice to take any necessary action.

While the present invention has been described with reference to exemplary embodiments thereof, it will be understood by those skilled in the art that various changes in form and details may be made therein without departing from the scope of the present invention as defined by the following claims.

What is claimed is:

1. A self-running robot having a pressing sensing function, comprising:
   a pressing sensing unit for sensing pressing on a top of the self-running robot; and
   a microprocessor for controlling a driving of the self-running robot in accordance with the sensing signal from the pressing sensing unit to enable the self-running robot to escape from an area where the pressing has occurred.

2. The self-running robot according to claim 1, wherein the microprocessor, when the pressing sensing signal is continuously received even after controlling the driving of the self-running robot in accordance with the pressing sensing signal, notifies a user of the above state in voice.

3. The self running-robot according to claim 2, wherein the self-running robot comprises:
   a memory for storing an audio signal used to notify the pressing; and
   an audio output unit for converting the audio signal stored in the memory into an audible sound under the control of the microprocessor and outputting the audible sound.

4. The self-running robot according to claim 1, wherein the pressing sensing unit is an ON/OFF switch provided on the top of the self-running robot.

5. The self running-robot according to claim 1, further comprising a rotation detection unit for outputting a signal corresponding to a rotational speed of left and right wheel motors to move the self-running robot,
   wherein the microprocessor controls the left and right wheel motors to enable the self-running robot to escape from a corresponding area when a running speed of the self-running robot computed by using the output signal from the rotation detection unit is slower than a reference speed.

6. The self-running robot according to claim 5, wherein, when the running speed of the self-running robot is slower than the reference speed even after controlling the driving of the self-running robot in accordance with the running speed of the self-running robot, the microprocessor notifies a user of the above state in voice.

7. The self-running robot according to claim 6, wherein the self-running robot comprises:
a memory for storing an audio signal used to notify the pressing; and
an audio output unit for converting the audio signal stored in the memory into an audible sound under the control of the microprocessor and outputting the audible sound.

8. The self-running robot according to claim 1, wherein the self running robot is a cleaning robot.

9. A method for controlling a self-running robot, comprising the steps of:
receiving a sensing signal from a pressing sensing unit to sense pressing on a top of the self-running robot; and
controlling a driving of the self-running robot in accordance with the sensing signal to enable the self-running robot to escape from an area where the pressing has occurred.

10. The method according to claim 9, further comprising the step of notifying, when the pressing sensing signal is continuously received even after controlling the driving of the self-ruining robot in accordance with the pressing sensing signal, a user of the above state in voice.

11. The method according to claim 9, further comprising the steps:
receiving a signal corresponding to a rotational speed of left and right wheel motors to move the self-running robot from a rotation detection unit; and
controlling the left and right wheel motors to enable the self-running robot to escape from a corresponding area when a running speed of the self-running robot computed by using the output signal from said step is slower than a reference speed.

12. The method according to claim 11, further comprising the step of notifying, when the running speed of the self-running robot is slower than the reference speed even after controlling the driving of the self-running robot in accordance with the running speed of the self-running robot, a user of the above state in voice.

13. The method according to claim 9, wherein the self-running robot is a cleaning robot.

* * * * *